United States Patent
Solmaz

(10) Patent No.: US 12,374,075 B2
(45) Date of Patent: Jul. 29, 2025

(54) METHOD AND SYSTEM FOR AUTOMATED VIDEO GENERATION FROM IMAGES FOR E-COMMERCE APPLICATIONS

(71) Applicant: eBay Inc., San Jose, CA (US)

(72) Inventor: Berkan Solmaz, San Jose, CA (US)

(73) Assignee: eBay Inc., San Jose, CA (US)

( * ) Notice: Subject to any disclaimer, the term of this patent is extended or adjusted under 35 U.S.C. 154(b) by 647 days.

(21) Appl. No.: 17/545,627

(22) Filed: Dec. 8, 2021

(65) Prior Publication Data

US 2023/0177836 A1 Jun. 8, 2023

(51) Int. Cl.
| | |
|---|---|
| G06Q 30/00 | (2023.01) |
| G06N 20/20 | (2019.01) |
| G06Q 30/0601 | (2023.01) |
| G06V 10/42 | (2022.01) |
| G06V 10/56 | (2022.01) |

(Continued)

(52) U.S. Cl.
CPC ........... *G06V 10/421* (2022.01); *G06N 20/20* (2019.01); *G06Q 30/0643* (2013.01); *G06V 10/56* (2022.01); *G06V 20/20* (2022.01); *G06V 20/46* (2022.01)

(58) Field of Classification Search
CPC ..... G06Q 30/0601–0645; G06Q 30/08; G06V 10/421; G06V 20/20; G06V 10/56; G06V 20/46; G06N 20/20
See application file for complete search history.

(56) References Cited

U.S. PATENT DOCUMENTS

| | | | |
|---|---|---|---|
| 10,121,187 B1 * | 11/2018 | Nair | G06Q 30/0633 |
| 2018/0137542 A1 | 5/2018 | Pesavento et al. | |

(Continued)

FOREIGN PATENT DOCUMENTS

| | | |
|---|---|---|
| CN | 202211569597.2 | 12/2022 |
| EP | 22211745.9 | 12/2022 |
| WO | 2019112145 A1 | 6/2024 |

OTHER PUBLICATIONS

Hagey, Paul, Now every listing can have its own dynamic video, Jun. 25, 2014, inman.com, accessed at [https://web.archive.org/web/20150330120550/https://www.inman.com/2014/06/25/now-every-listing-can-have-its-own-dynamic-video/] (Year: 2014).*

(Continued)

*Primary Examiner* — Jeffrey A. Smith
*Assistant Examiner* — Lindsey B Smith
(74) *Attorney, Agent, or Firm* — FIG. 1 Patents

(57) ABSTRACT

Systems and methods are provided for automatically generating a video associated with an item in the marketplace. An image receiver receives images associated with an item of an item listing. An image extractor generates visual descriptors for each image through computer vision analysis and extracts a unique set of images by removing redundant images. An image sorter sorts images in the unique set of images based on an item category and generates a sequence of images for generating a video. A text placer automatically identifies a region in an image and inserts text into the image using textual attributes as predicted by a model. A video data optimizes a generated video using another model trained based on manual adjustments previously made to other exemplary video data. The disclosed technology publishes the automatically generated video data for viewing by viewers in the marketplace.

14 Claims, 7 Drawing Sheets

(51) Int. Cl.
    *G06V 20/20*     (2022.01)
    *G06V 20/40*     (2022.01)

(56) References Cited

U.S. PATENT DOCUMENTS

| | | | |
|---|---|---|---|
| 2020/0226179 A1 | 7/2020 | Novikoff et al. | |
| 2021/0117471 A1* | 4/2021 | Rav-Acha | G06F 16/7837 |
| 2021/0133861 A1* | 5/2021 | Kumar | G06F 18/214 |

OTHER PUBLICATIONS 22211745.9, "Communication under Rule 71(3) Received for European Patent Application No. 22211745.9, mailed on Apr. 8, 2024", Apr. 8, 2024, 7 pages.

22211745.9, "Extended European Search Report received for European Patent Application No. 22211745.9, mailed on May 11, 2023", May 11, 2023, 17 pages.

24175068.6, "EP Search Report", EP Application 24175068.8, Jul. 4, 2024, 5.

European Patent Office, "Partial European search report," issued in connection with European Patent Application No. 22211745.9 dated Apr. 3, 2023 (15 pages).

* cited by examiner

METHOD AND SYSTEM FOR AUTOMATED VIDEO GENERATION FROM IMAGES FOR E-COMMERCE APPLICATIONS

BACKGROUND

An e-commerce marketplace system provides tools for sellers to present goods to buyers by use of images, videos, and text descriptions of the goods. Manually editing the video data often imposes a burden upon the sellers to master the video editing tools. In practice, the sellers need to become proficient in use of the video editing tools to insert a text into specific video frames by manually position and adjust the text by specifying a font, size, and color in specific video frames. In practice, an automatic generation of a video, which leaves a need for manual adjustments by the sellers, raises costs of operations. Thus developing a technology that better meets the needs while minimizing trade-offs would be desirable.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

According to the present disclosure, the above and other issues are resolved by automatically generating a video associated with an item in an item listing based on a machine-learning model. The present disclosure relates to automatically generating video data of goods (e.g., an item or multiple items for sale) in an e-commerce shopping marketplace using one or more of machine-learning models. An image receiver receives images associated with an item of an item listing and/or multiple item listings. An image extractor generates visual descriptors associated with each image through computer vision analysis and extracts a unique set of images by removing redundant/duplicate images. An image sorter sorts the images using a machine-learning model and generates a sequence of images, which corresponds to a sequence of video segments of a video. A text placer automatically identifies a region in a video frame and/or an image using another machine-learning model and inserts text data into the video frame and/or the image. A video data optimizer optimizes the video based on a pattern of previous adjustments and refinements to other video data done manually by users. The disclosed technology stores and publishes the automatically generated video data for viewing by viewers (e.g., buyers) in an online shopping marketplace.

The disclosed technology includes a first machine-learning model, referred to as a visual description model, to predict and generate a visual descriptor for an image. Additionally or alternatively, the disclosed technology includes a second machine-learning model, referred to as a visual transition model, to predict a sequence of images associated with an item in video data based on a category of the item and/or attributes of the seller. Additionally or alternatively, the disclosed technology includes a third machine-learning model, referred to as a region model, to predict regions within video frames for placing text data. The third machine-learning model further predicts text attributes of a text for insertion into the video data. Additionally or alternatively, a fourth machine-learning model, referred to as a video data model, automatically optimizes video data based on exemplary adjustments that are previously made manually by video editors.

The present disclosure relates to systems and methods for automatically generating video data according to at least the examples provided in the sections below. In particular, the present disclosure relates to a computer-implemented method for automatically generating a video for an item listing in an e-commerce system. The method comprises receiving a set of images, wherein the set of images comprises a plurality of images received as part of the item listing; generating a set of visual descriptors for the set of images, wherein generating the set of visual descriptors comprises computing a visual descriptor, using a first machine-learning model, for each image in the set of images; comparing visual descriptors from the set of visual descriptors to identify one or more redundant images in the set of images; generating, based on the compared visual descriptors, a unique set of images by removing the one or more redundant images from the set of images; determining, based on the unique set of images, an ordered set of images, wherein the ordered set of images is ordered based at least upon a category of the item listing; automatically determining, using additional data from the item listing, text associated with one or more images in the ordered set of images, wherein the text associated with the one or more images is automatically added to the one or more images; automatically generating, based on the ordered set of images, the video, wherein the video comprises the ordered set of images; and providing the video as part of the item listing.

The system comprises a processor; and a memory storing computer-executable instructions that when executed by the processor cause the system to receiving a set of images, wherein the set of images comprises a plurality of images received as part of the item listing; generating a set of visual descriptors for the set of images, wherein generating the set of visual descriptors comprises computing a visual descriptor, using a first machine-learning model, for each image in the set of images; comparing visual descriptors from the set of visual descriptors to identify one or more redundant images in the set of images; generating, based on the compared visual descriptors, a unique set of images by removing the one or more redundant images from the set of images; determining, based on the unique set of images, an ordered set of images, wherein the ordered set of images is ordered based at least upon a category of the item listing; automatically determining, using additional data from the item listing, text associated with one or more images in the ordered set of images, wherein the text associated with the one or more images is automatically added to the one or more images; automatically generating, based on the ordered set of images, the video, wherein the video comprises the ordered set of images; and providing the video as part of the item listing.

The method comprises receiving a set of images, wherein each of images in the set of images describes in part an item for transaction in an online shopping marketplace, wherein the set of images include a first image and a second image, and wherein the first image includes a first region depicting the item; determining, based on a category of the item, a sequence of the set of images using a machine-learning model, wherein the sequence includes the first image preceding the second image; automatically generating the video, wherein the video includes a first video segment with the first image proceeding a second video segment with the second image; determining a second region in the first video segment, wherein the second region is without an overlap with the first region; inserting text data into the second region; and publishing the video in the online shopping marketplace for viewing.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
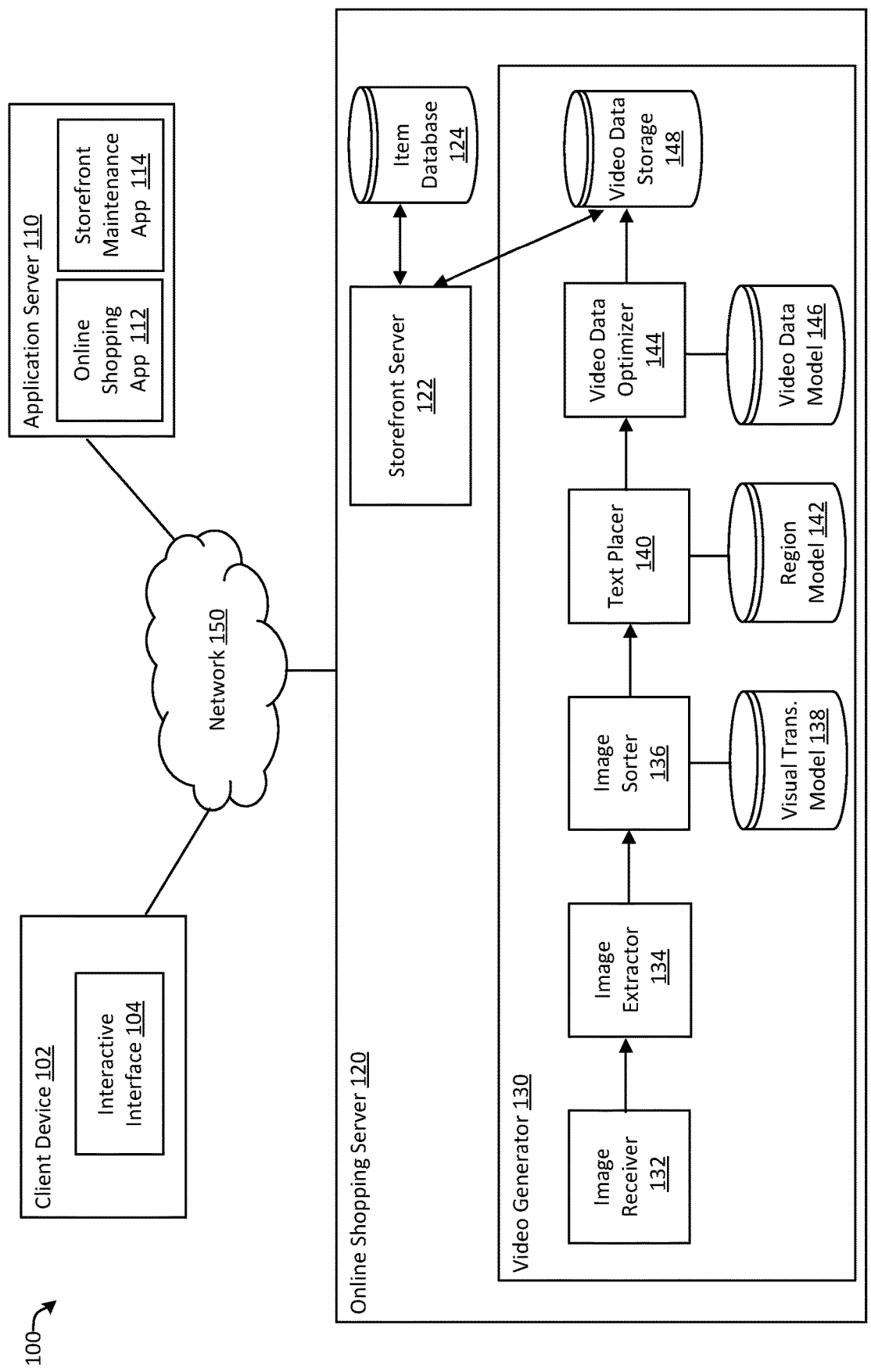
FIG. 1 illustrates an overview of an example system for automatically generating a video in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Online shopping systems, including e-commerce shopping marketplace systems, present the information associated with the item to buyers. The information associated with the item may include image data, video data, and textual descriptions of the item. For example, the item may be a pair of shoes for sale. In aspects, a webpage associated with the pair of shoes may include a name and textual description of the pair of shoes, one or more images of the pair of shoes, and one or more videos about the pair of shoes. The online shopping systems provide a set of tools for the sellers to upload the information associated with the pair of shoes.

In some cases, online shopping systems rely upon sellers to upload the information associated with the item for sale. Alternatively or additionally, some online shopping systems provide stock images for users to associate with their listing. Furthermore, an online shopping system can provide a set of tools for the sellers to upload the information to a server (e.g., a cloud) over the Internet. While preparing image data associated with an item may be relatively easy for the sellers by taking photos of the item, preparing video data often causes burdens upon the sellers because of a level of skills needed to create a video. Some traditional online shopping systems provide tools for automatically generating a video based on a set of image and textual data uploaded to the server by the sellers. Some automated tools concatenate the image data in a predetermined time interval of video data, in a sequence of the image data uploaded to the server without automatic sorting. As a result, the automatically generated video in the traditional systems may appear disorganized and counter-intuitive to viewers (e.g., buyers). Not all images may be appropriate for including in the video. For example, some sellers may upload multiple image data of the same appearance of the item but at distinct pixel resolutions of image data. Some systems leave steps of deciding a selection of image data and a sequence of the image data to the sellers as manual operations.

Some tools automatically insert a text (e.g., "70% Off Plus Free Shipping") at random or predefined positions within video frames of the video data. Such tools may insert the text in a predefined font, size, orientation, and color. As a result, the text may block an image of the item by overlaid on the item. The text may be illegible in the video because its color that blends into the image data. The font and size may appear intuitively awkward to the buyers in comparison to the item appearing in the video. Some systems leave steps of inserting texts into the video data to the sellers as manual operations. A burden imposed upon the seller to edit video data by mastering a video editing tool may be excessive.

Accordingly, there is a trade-off in an online marketplace between generating a video that appear logical and persuasive to buyers and costs of doing so. The present application solves this trade-off issue by providing a system that automatically sorts image data using a first machine-learning model with context analysis, generates video data, and inserts text data into video data using a second machine-learning model with weighted image analysis. The present application enables balancing competing demands of effectiveness and efficiency of the marketplace by use of the automatic video generator.

As discussed in more detail below, the present disclosure relates to machine-learning, models for automatically generating a video that describes an item in an online shopping marketplace. In particular, the models include predicting a sequence of image data in video frames, predicting a region for inserting text data into the video frames, and optimizing video data.

FIG. 1 illustrates an overview of an example system 100 for automatically generating a video. System 100 represents a system for using machine learning models (e.g., artificial intelligence) to sort image data associated with an item for generating video frames for video data, insert text data into video frames of the video data, and optimizing the video data. System 100 includes a client device 102, an application server 110, an online shopping server 120, and a network 150. The client device 102 communicates with the application server 110, which includes one or more sets of instructions to execute as applications on the client device 102. The application server 110 includes an online shopping app 112 (e.g., a buyer application) and a storefront maintenance app 114 (e.g., a seller application). The one or more sets of instructions in the application server 110 may provide an interactive user interface (not shown) through an interactive interface 104. In alternate embodiments, a single application may perform the buying and selling functionality of the online shopping app 112 and the storefront maintenance app 114.

The online shopping server 120 includes a storefront server 122, an item database 124, and a video generator 130. The network 150 provides network connectivity among the client device 102, the application server 110, and the online shopping server 120. Additionally or alternatively, the video generator 130 may be outside the online shopping server 120 across the network 150, thereby the network 150 providing network connectivity among the client device 102, the application server 110, the online shopping server 120, and the video generator 130.

The client device 102 connects with the application server 110 via the network 150 to execute applications that include user interactions through the interactive interface 104. The application server 110 interacts with the client device 102 and the online shopping server 120 via the network 150 to perform online shopping as a seller or a buyer of items.

The client device 102 is a general computer device providing user-input capabilities e.g., via the interactive interface 104 for online shopping over the network 150. In some aspects, the client device 102 optionally receives user input from a seller of items. The seller uploads information about an item for sales transactions in an online shopping marketplace. The information about the item includes image data of the item, a brief description of the item, price information, quantity information, and the like. The interactive interface 104 may render a graphical user interface associated with a web browser, for example. In aspects, the client device 102 may communicate over the network 150 with the application server 110.

The application server 110 is a server that enables a seller (who may post items for sale) and a buyer (who purchases the items) to interactively access and use the system 100 on the client device 102. The application server 110 may comprise applications including the online shopping app 112 and the storefront maintenance app 114. The online shopping app 112 may provide a rendering of items for a purchase by the user as the buyer. The storefront maintenance app 114 may provide one or more tools for the seller to upload information associated with items (i.e., item information) for posting items for sale in the e-commerce shopping marketplace. In aspects, the item information include a name and textual descriptions of the item, image data associated with the item, a price and a quantity of the item available for sales. In aspects, the storefront maintenance app 114 may connect with a storefront server 122 of the online shopping server 120 to post information about an item for sale on an online shopping site (not shown). In some aspects, the storefront maintenance app 114 may further connect with a video generator 130 of the online shopping server 120 to upload image data associated with the item. The video generator 130 may automatically generate video data that describes the item for use by the storefront server 122. In some other aspects, the storefront maintenance app 114 may provide a tool for uploading video data that describe the item when the seller prepares the video data on its own. The storefront maintenance app 114 may receive a confirmation from the online shopping server 120 when the online shopping server 120 successfully receives the information about the item.

In aspects, the information about the item may include a name, a brief description, a quantity, a price, and one or more image data that depict the item. Additionally or alternatively, the information about the item includes category information of the item. For example, the item may be a pair of shoes. The one or more image data may include photos of the pair of shoes in different views with background scenes for use. The one or more image data may further include a close-up of product information label with a product code, a serial number of the pair of shoes, and a list of features of the pair of shoes The online shopping server 120 represents the applications/systems used for automatically generating video data associated with items for sale. The online shopping server 120 further provides a storefront to sell the item on the online shopping site (not shown). The video generator 130 automatically generates video data for a given set of image data associated with an item for sale. The video generator 130 uses one or more artificial intelligence models, machine-learning models, or the like, to improve accuracy in the automatic operations. The video generator 130 includes an image receiver 132, an image extractor 134, an image sorter 136, a visual transition model 138, a text placer 140, a region model 142, a video data optimizer 144, a video data model 146, and a video data storage 148.

The image receiver 132 receives image data associated with an item from the storefront maintenance app 114 used by a seller through the interactive interface 104 on the client device 102. Among other things, the image data about the item includes photos of a product logo, a brief description, and image data of the item. The image receiver 132 may further receive information associated with the item. The information associated with the item may include but not limited to a category of the item. For example, the image receiver 132 may receive from the storefront maintenance app 114 of the Application server 110 a set of image data associated with a pair of shoes and a category of the item as shoes. In some aspects, the received image data may include images that are received as part of the item listing.

The image extractor 134 extracts one or more image data from the received image data by use of image analysis. The image extractor 134 analyzes the received image data and identifies those that are identical or very similar. In aspects, the image extractor 134 selects a set of image data by removing redundant image data. In some aspects, the image extractor 134 select a unique set of image data such that a number of image data matches with a predetermined number of image data for generating video data with a predetermined time duration. Extraction criteria may include by image data that are redundant and/or a level of clarity of the image data. In aspects, the image extractor 134 outputs the unique set of image data.

For example, a seller may upload image data associated with a pair of shoes for sale. The image data may include thirty photos of the pair of shoes from various views and in distinct pixel resolutions. Some of the photos may look identical or very similar to one another. The image data may further include an image of a list of features of the pair of shoes (e.g., a name, color, size available, materials used, and the like). The predetermined time duration of a video may be for sixty seconds, which may translate into including ten pieces of image data as the predefined number of image data for extraction. Accordingly, the image extractor 134 may extract a unique set of image data by selecting a number of unique photos and image data that is sufficient for a number of image data needed for the video.

The image sorter 136 sorts a set of image data extracted from the received image data for automatically generating video data. In particular, the image sorter 136 automatically determines a sequence of the image data using a visual transition model 138. In aspects, the visual transition model 138, when trained, predicts a sequence (e.g., an ordering) of image data based on a given category of an item for sale. In aspects, the visual transition model 138 may further specify time duration of respective video segments with respective contexts of image data (e.g., an overview photo, close-ups, item features, and the like) under the given category of an item. In aspects, conditions for a sequence (e.g., order criteria) may include a category of an item for sale.

In aspects, a video comprises video data. The video data includes a plurality of video segments in varying time durations for each video segment. A time duration of each video frame may be constant throughout the video data. Image data appear as a part of content of a video frame. A sequence of image data may correspond to a sequence of video segments that include the respective image data.

For example, the image sorter 136 may sort a set of image data associated with a pair of shoes under a category of item "shoes." The visual transition model 138 may be trained to predict a sequence of image data for generating a sequence of video frames of a video. The video describes a pair of shoes. The sequence of image data may start with a photo of the pair of shoes in a birds eye view, followed by close-ups of views from various angles, followed by descriptions of the pair of shoes, and ending by the bird's eye view of the item. The image sorter 136 sorts the extracted image data of the pair of shoes into the sequence associated with the product category of shoes.

In aspects, the image sorter 136 generates video data uses the sequence of image data in the sequence of video frames of the video data. The image sorter 236 may generate the video data with the predetermined time durations by generating respective video frames according to time durations as specified by the visual transition model 138. In aspects, the visual transition model 138 may be trained based on video data stored in the video data storage 148. The video data stored in the video data storage 148 may correspond to other items under a variety of categories.

The text placer 140 places texts into video frames of the video data. In particular, the text placer 140 determines one or more video frames and regions within the one or more video frames and inserts a given text in the regions. In aspects, the text placer 140 receives text data and determines a set of video frames and regions within the set of video frames for inserting the text data. The text placer 140 may use the visual transition model 138 to determine the set of video frames. The text placer 140 may further use the region model 142 to determine the regions within the set of video frames for inserting the text data. In aspects, the visual transition model 138 may predict a set of video frames for inserting a particular context associated with the text data. For example, when the text data represent a context of a promotional aspects of sales transactions (e.g., "70% Off PLUS Free Shipping"), the visual transition model 138 may predict inserting the text data in a set of video frame with the birds eye view of the item toward the end of the video.

In aspects, the region model 142 may predict a region for inserting text data into a video frame by preventing the text data from blocking an image of an item. The region model 142 further predicts textual attributes (e.g., a font, size, color, and the like) for inserting the text data. For example, use of the predicted textual attributes may prevent the text data from becoming illegible because by predicting a color that is distinct from the background color of the region. The text placer 140 outputs video data that includes with text data in video frames.

For example, in a given text data "70% Off PLUS Free Shipping" for insertion into video data of the pair of shoes, the text placer 140 selects a set of video frames with the birds eye view of the pair of shoes toward the end of the video data. The text placer 140 selects the set of video frames as predicted by the visual transition model 138. The text placer 140 then determines a region in the respect video frames for inserting the text data. The region model 142 may predict a region that does not overlap with an image of the pair of shoes in the set of video frames and specify a font, color, and size for rendering the text data.

The video data optimizer 144 optimizes the video data with texts. In aspects, the video data optimizer 144 uses a video data model 146 to predict ways for optimizing the video data. The video data model 146 may be a model that is trained based on video data stored in the video data storage 148, which includes examples of adjustments and customizations performed by the sellers on automatically generated video data. In some other aspects, the video data model 146 may be trained based on review data on respective video data by viewers (including the buyers and the sellers) of the video data on the online shopping site. For example, adjustments to the video data may include changes in a brightness, a video aspect ratio, a resolution, a file size, and the like. The video data optimizer 144 optimizes the video data and stores the video data in the video data storage 148.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
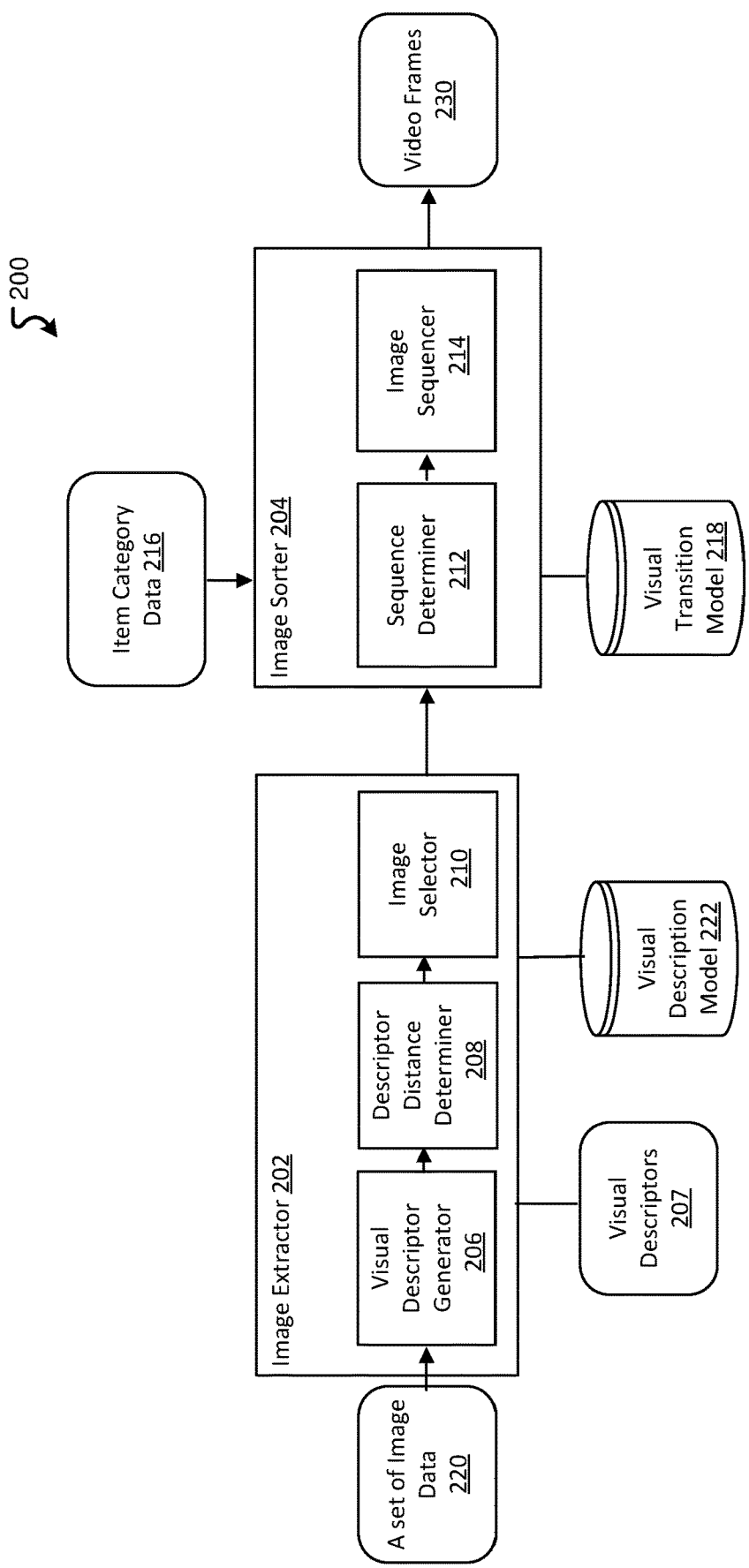
FIG. 2 illustrates an example of an image sorter in accordance with aspects of the present disclosure.

FIG. 2 illustrates an example of a system for extracting and sorting image data in according to the aspects of the present disclosure. For example, an image extractor may include the image extractor 134 as shown in FIG. 1. An image sorter may include the image sorter 136 as shown in FIG. 1. A system 200 includes the image extractor 202 and the image sorter 204. The image extractor 202 receives a set of image data 220 as input and generates a set of select image data (i.e., extracted image data) by selecting one or more image data from the set of image data 220 by removing redundant image data. In aspects, the image sorter 204 uses a visual transition model 218 for sorting the extracted image data into a sequence (i.e., an ordered set) of video frames based on the item category data 216. The image sorter 204 generates an ordered set of video frames as video data based on the sorted sequence of the select image data. For example, the set of image data 220 includes a set of image data of a pair of shoes as an item for sale. The item category data 216 may include "shoes" as a category of the item.

The image extractor 202 may include a visual descriptor generator 206, a descriptor distance determiner 208, and an image selector 210. The visual descriptor generator 206 identifies and/or generates visual descriptors 207 associated with respective image data in the set of image data 220. The visual descriptors 207 may indicate visual characteristics of image data. In aspects, the visual descriptors 207 may include but not limited to a type of visual content, shape, appearance, color, viewpoint, and the like. In aspects, the visual descriptor generator 206 may use a visual description model 222 to generate a visual descriptor associated with each image data. In some aspects, the visual description model 222 represents a machine-learning model that is used to predict a visual descriptor for a given image based on pattern matching of images. The visual description model 222 may be trained based on examples of images and true examples of image descriptors. In aspects, the visual descriptor generator 206 may employ a technique that relates to a computer vision analysis identifying a visual descriptor for an image.

The descriptor distance determiner 208 determines distances between one or more pairs of image data in the extracted image data. In aspects, the descriptor distance determiner 208 determines a distance between each pair of a combination of pairs of the extracted image data. The distance may be based on similarities in the visual descriptors 207 of the extracted image data. For example, the descriptor distance determiner 208 may determine two photos of the pair of shoes in a birds eye view as short in distance because both photos depict the pair of shoes in the same viewpoint. In aspects, the descriptor distance determiner 208 determines a set of image data that include image data that are similar in visual descriptors.

The image selector 210 generates a set of select image data by removing image redundant data by comparing the determined distances with a predefined threshold distance. In some aspects, the image selector 210 may remove image data that are below a predetermined level of visual quality. For example, a level of visual quality may indicate a severity level of noises in image data.

The image sorter 204 sorts the image data using a combination of the set of select image data, item category data 216, and the visual transition model 218. The image sorter 204 includes a sequence determiner 212 and an image sequencer 214. The sequence determiner 212 determines a sequence of the extracted image data based on a combination of at least the following three aspects. A first is the set of image data with similar distances in visual descriptors. A second is the received item category data 216. A third is a sequence of video frames based on the image data as predicted by the visual transition model 218. For example, the sequence determiner 212 determines a sequence of video frames for describing the pair of shoes based at least on a combination of photos and images with distinct visual descriptors about the pair of shoes, the item category of shoes, and a predicted sequence of visual transitions about a shoes video.

The visual transition model 218 predicts a sequence of image data for generating video frames based on a given attribute of selling an item in the online shopping site. The attribute of selling an item may include but not limited to a category of an item for sale, a type of viewers (e.g., a level of expertise of the buyers using the item), and the like. For example, the visual transition model 218 predicts a sequence of video frames for a video that describes a pair of shoes. The sequence may correspond to a video with sixty seconds of duration. The sequence may include a first scene with an overview of the pair of shoes, a second scene with close-ups (e.g., in a sequence of a right side view, a left side view, a top view, a view of the sole, and the like), a third scene with the overview of the pair of shoes. The sequence may also include information associated with inserting text data into the respective video frames. For example, the information may include marking the third scene as appropriate for inserting text data associated with sales promotion of the item. In aspects, the video transition model predicts a sequence of video frames with visual descriptors associated with the respective video frames. Use of the visual transition model 218 enables the sequence determiner 212 to determine a sequence of video frames with visual transitions that are smooth and contextually meaningful to the viewers.

The image sequencer 214 generates video data with a sequence of video frames with image data as specified by the visual transition model 218. In aspects, the visual transition model 218 specifies time durations of respective video segments of the video data. For example, the image sequencer 214 generates a sequence of video frames 230 as video data for the pair of shoes based on the extracted image data of the pair of shoes and the predicted sequence of video frames by the visual transition model 218.

Figure 3:
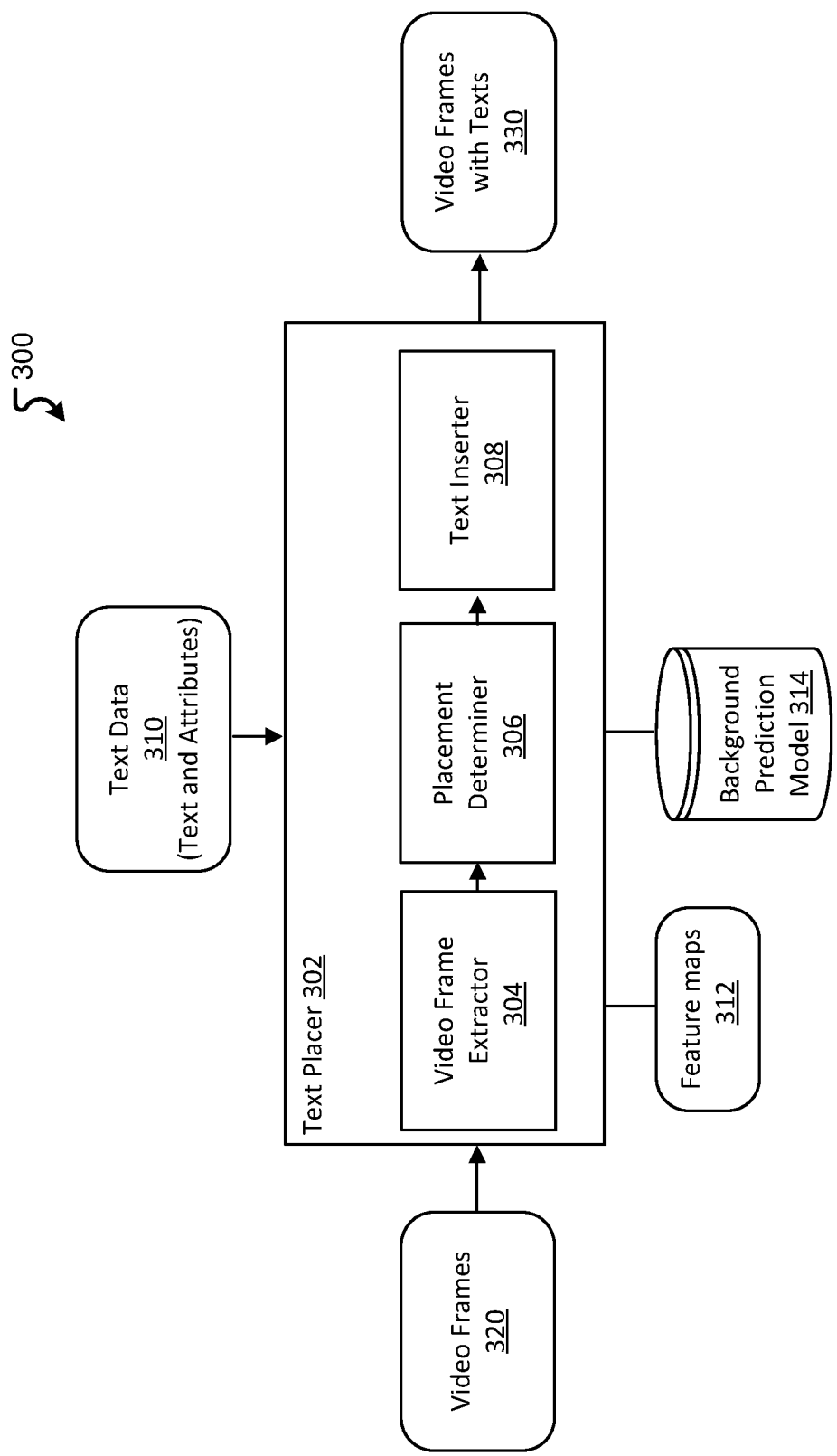
FIG. 3 illustrates an example of a text placer in accordance with aspects of the present disclosure.

FIG. 3 illustrates an example of a system with a text placer in accordance with the aspects of the present disclosure. For example, the text placer may include the text placer 140 as shown in FIG. 1. A system 300 includes a text placer 302. The text placer 302 may receive a set of video frames 320 and text data 310 as input, identifies video frames of a video segment and a region within the video frames, and inserts the text data 310 into the region within in the video frames of the video segment. The text placer 302 may use a background prediction model 314 for determining the region for inserting the text data 310. In aspects, the disclosed technology may automatically determine the text data 310 for insertion into video frames 320 based on information associated with item listing. For example, the information associated with the item listing may include a name of an item, a catch copy associated with the item, a description of sales promotion, and the like. In aspects, the text placer 302 may obtain the text data 310 from the item database 124.

The text placer 302 includes a video frame extractor 304, a placement determiner 306, and a text inserter 308. The video frame extractor 304 extracts respective video frames from the set of video frames 320 for analyzing content of the respective video frames. In aspects, the video frame extractor 304 generates feature maps 312 (e.g., a feature map 462 as shown in FIG. 4B) corresponding to with the respective video frames. A feature map includes locations of feature points of a video frame. The feature points may indicate locations within a video frame that depict features (e.g., an edge) of an image of an item. The feature points may be on the edges, the corners or at any location indicative of a feature. For example, the disclosed technology may use SIFT (the scale-invariant feature transform) feature points and calculate and/or determine a map based on them. Additionally or alternatively, the disclosed technology may use a model for determining optimal text attributes without detecting feature points.

Maybe that single model will generate a map which defines where the optimal text box would be. The text placer 302 determines a location for inserting the text data 310 by avoiding an overlay of the text data on the feature points in the map.

The placement determiner 306 determines a region and textual attributes for inserting the text data 310 in the video frames. In aspects, the placement determiner 306 determines a region for inserting the text data 310 based on the feature maps 312 and the background prediction model 314. In aspects, the background prediction model 314 predicts a region and color for inserting text data in a video frame based on the feature maps 312 of the respective video frames. The region may be without overlapping or including feature points in the feature maps 312. The placement determiner 306 further determines a font and size of the text data for fitting the text data into the region. For example, the placement determiner 306 determines a region that does not overlap with an image of the pair of shoes in the video frames and further determines a font and a font size that enables fitting the text data "70% PLUS Free Shipping" inside the region. In aspects, the disclosed technology may train the background prediction model 314 based on exemplar data using the video data stored in the video data storage (e.g., the video data storage 148 as shown in FIG. 1).

The text inserter 308 inserts the text data 310 into a region within the video frame using a font, size, and color as specified by the placement determiner 306. In aspects, the text inserter 308 generates a set of video frames with texts 330. For example, the text inserter 308 may insert a text string "70% Off PLUS Free Shipping" in a set of frame data corresponding to a video segment toward the end of the video data. The text inserter 308 may insert the sales promotion information in a region that does not overlap with an image of the pair of shoes in the video frames.

Figure 4A:
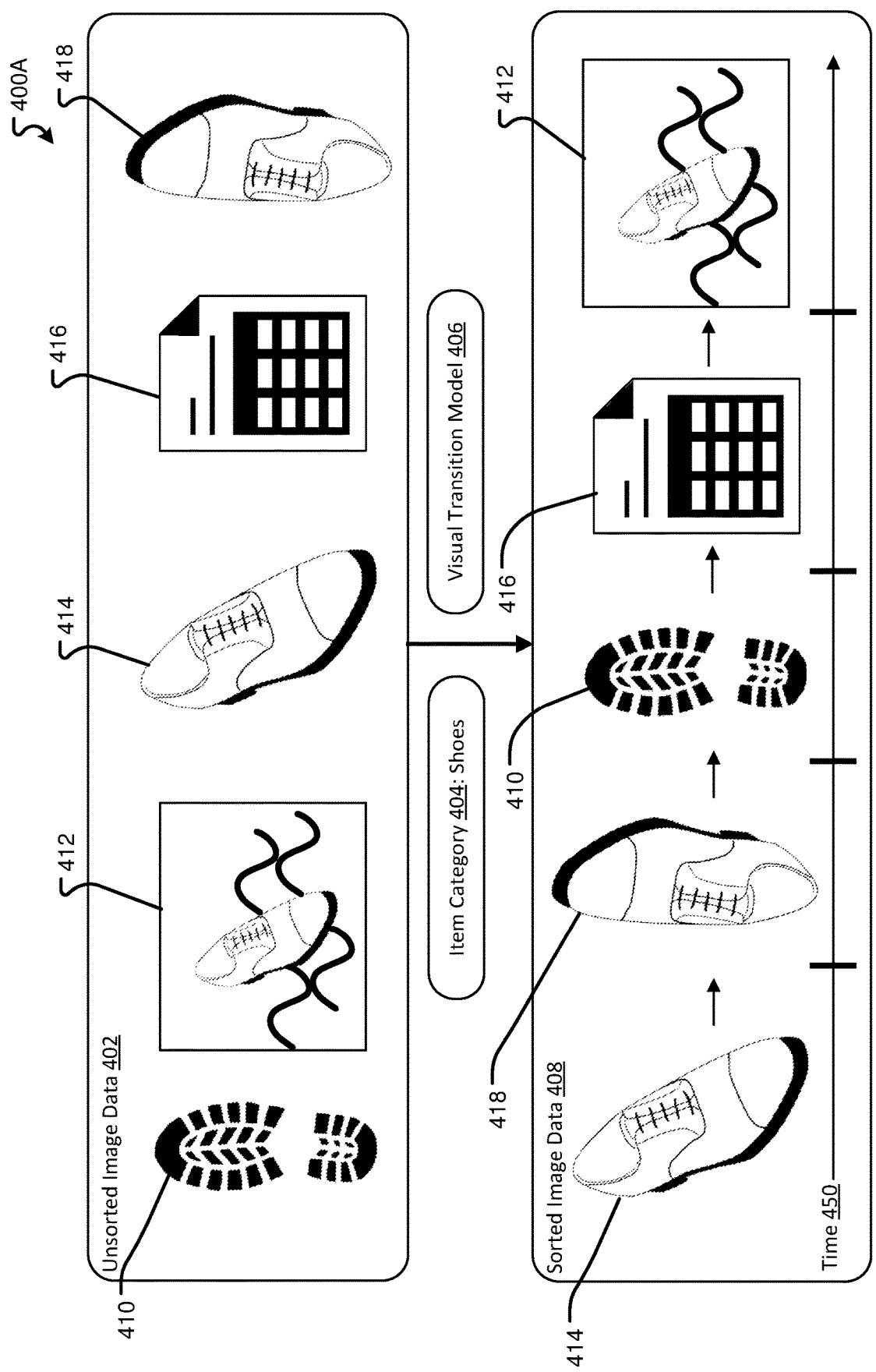
FIG. 4A illustrates an example of extracting and sorting images in accordance with aspects of the present disclosure.
Figure 4B:
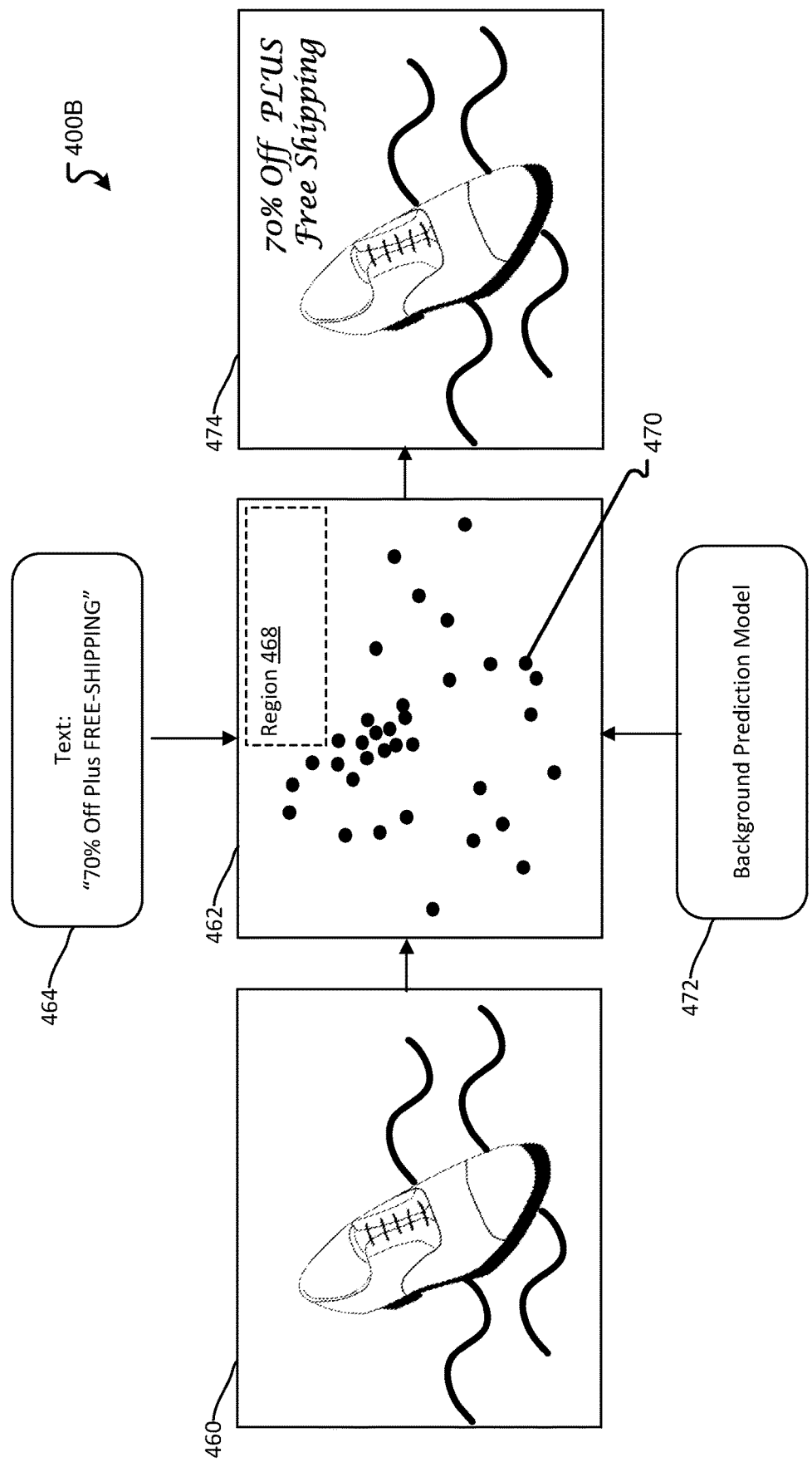
FIG. 4B illustrates an example of placing text in accordance with aspects of the present disclosure.

FIG. 4A illustrates an example of image data in accordance with the aspects of the present disclosure. The example 400A includes unsorted image data 402 and sorted image data 408. The unsorted image data 402 includes image data associated with a pair of shoes as an item for sale, in a sequence of the respective image data uploaded by the seller. The image data may be in a sequence of a sole 410, an overview with a scenery 412, an upper view 414, an item description data 416, and an overview in a vertical orientation 418.

In aspects, the image sorter (e.g., the image sorter 136 as shown in FIG. 1) may sort the unsorted image data 402 into the sorted image data 408 based on an item category 404 of shoes and a visual transition model 406 (e.g., the visual transition model 218 as shown in FIG. 2). The visual transition model 406 may predict a sequence of video frames for generating a video based on an item category 404. In the example 400A, the visual transition model 406 specifies a sequence of frame data with particular visual descriptors of each of the image data in the unsorted image data 402 for generating a video on the pair of shoes. In aspects, the sorted image data 408 reflects the predicted sequence of video frames. For example, the predicted sequence may be the upper view 414, the overview in a vertical orientation 418, the sole 410, the item description data 416, and then the overview with a scenery 412. In aspects, the sorted image data 408 includes time 450, which describes time durations of respective video segments as visual transitions take place at predetermined times.

FIG. 4B illustrates an example of inserting text data into a video frame in accordance with aspects of the present disclosure. An example 400B includes a video frame 460 before text insertion, a feature map 462 associated with the video frame 460, and a video frame 474 with text insertion. In aspects, a text placer (e.g., the text placer 140 as shown in FIG. 1) extract the video frame 460 from a set of video frames, generates a feature map 462, determines a region for inserting text data, and inserts the text data into content of the video frame.

In aspects, the feature map 462 includes a set of points. Each point indicates a feature of content of the video frame. The feature may represent an edge of an image within the content based on changes in color and/or an image texture of the content. For example, a feature point 470 corresponds to a tip of a shoe as shown in the video frame 460. The text 464 represents text data ("70% Off Plus FREE-SHIPPING") for inserting into the video frame 460. The background prediction model 472 may predict a region 468 and textual attributes for the text insertion based on a combination of the content of the video frame 460 (e.g., an image of the shoe with a scenery) the feature map 462, and the text 464.

Additionally or alternatively, the disclosed technology may include training a model to estimate, in a direct manner, the positions of an optimal text box based on annotated or collected data for training. For example, training data may be images with annotations that indicate corresponding optimal text positions. The model may use predetermined features or texture maps as input. The model may receive an image as input for determining the positions.

In aspects, the background prediction model 472 identifies the region 468 as an optimal location and a size to insert the text data. For example, the region 468 is without overlapping with the image of the shoe and the background scenery. The background prediction model 472 may further predict textual attributes for inserting the text 464 based on an image texture with curves in the content of the video frame, a number of characters in the text 464. The background prediction model 472 may further specify letter cases used for letters of the text 464. Accordingly, the text placer inserts the text 464 and generates the video frame 474 using a font with curves that matches with the image texture, size that fits into the region 468, and letter cases that optimizes expression of the text as a promotion announcement of the item.

Figure 5:
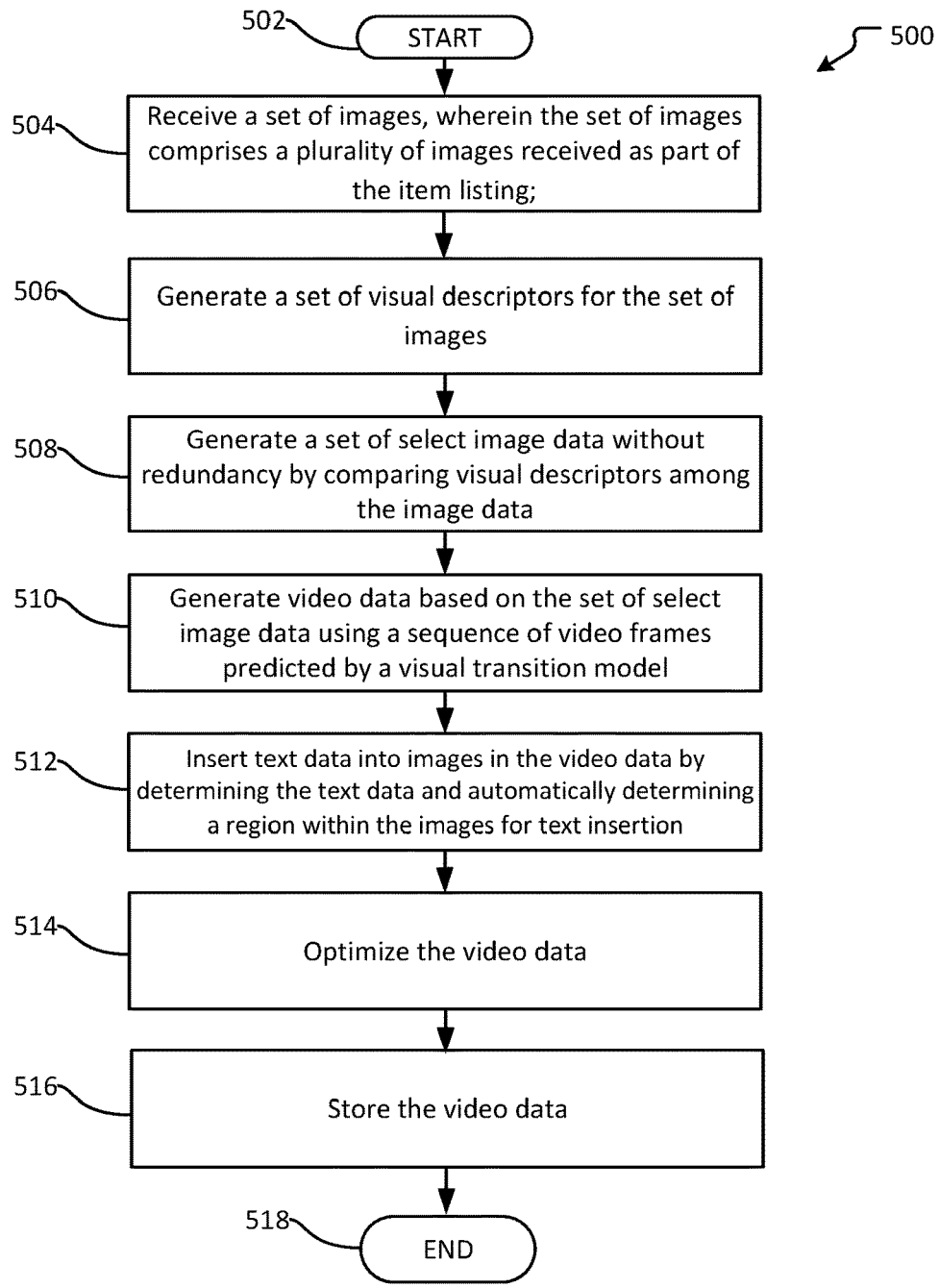
FIG. 5 illustrates an example of a method for automatically generating a video in accordance with aspects of the present disclosure.

FIG. 5 is an example of a method for automatically generating a video in accordance with aspects of the present disclosure. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-B, and 6.

Following start operation 502, the method 500 begins with receive operation 504, which receives a set of images. The set of image may include a plurality of images uploaded from a storefront maintenance app (e.g., the storefront maintenance app 114 of the Application server 110 as shown in FIG. 1).

A generate visual descriptors operation 506 generates visual descriptors associated with the respective image data. Visual descriptors represent visual characteristics of image data, including but not limited to color, appearance, texture, and the like.

A generate select image sets operation 508 generates a set of select image data that are without redundant image data. In aspects, the generate select image sets operation 508 may select image data by removing those image data that are duplicates and/or very similar based on visual descriptors. In aspects, the similarity is based on a distance between visual descriptors of video frames.

A generate video data operation 510 generates video data based on a set of select image data, sorted based on the visual transition model. In aspects, the visual transition model predicts a sequence of video frames based on a given item category data. For example, the visual transition model may specify a particular sequence of video segments (i.e., a sequence of image data) associated with a shoe as an item category.

An insert operation 512 inserts text data into the video data. In particular, the insert operation 512 may include extracting video frames from the video data, generating a feature map associated with a video frame, and determining a region in the video frame using a background prediction model (e.g., the background prediction model 314 as shown in FIG. 3) for inserting text data associated with an item. Additionally or alternatively, the disclosed technology may generate the video data after inserting the text data into image data. In aspects, the insert operation 512 may precede the generate video data operation 510.

An optimize operation 514 automatically optimizes the video data with text inserts using a video data model. For example, the video data model (e.g., the video data model 146 as shown in FIG. 1) may predict adjustment to be made on the video data based on past occurrences of a user manually adjusting various parameters associated with the video data. In aspects, the various parameters may include brightness and contrast of content of video frames, color, a pixel resolution, and the like.

A store operation 516 stores the optimized video data in a video data storage (e.g., the video data storage 148 as shown in FIG. 1). In aspects, the storefront server (e.g., the storefront server 122 as shown in FIG. 1) may post the video data on item listing pages of the online shopping site for viewing and downloading by viewers and buyers. The method 500 ends with an end operation 518.

Figure 6:
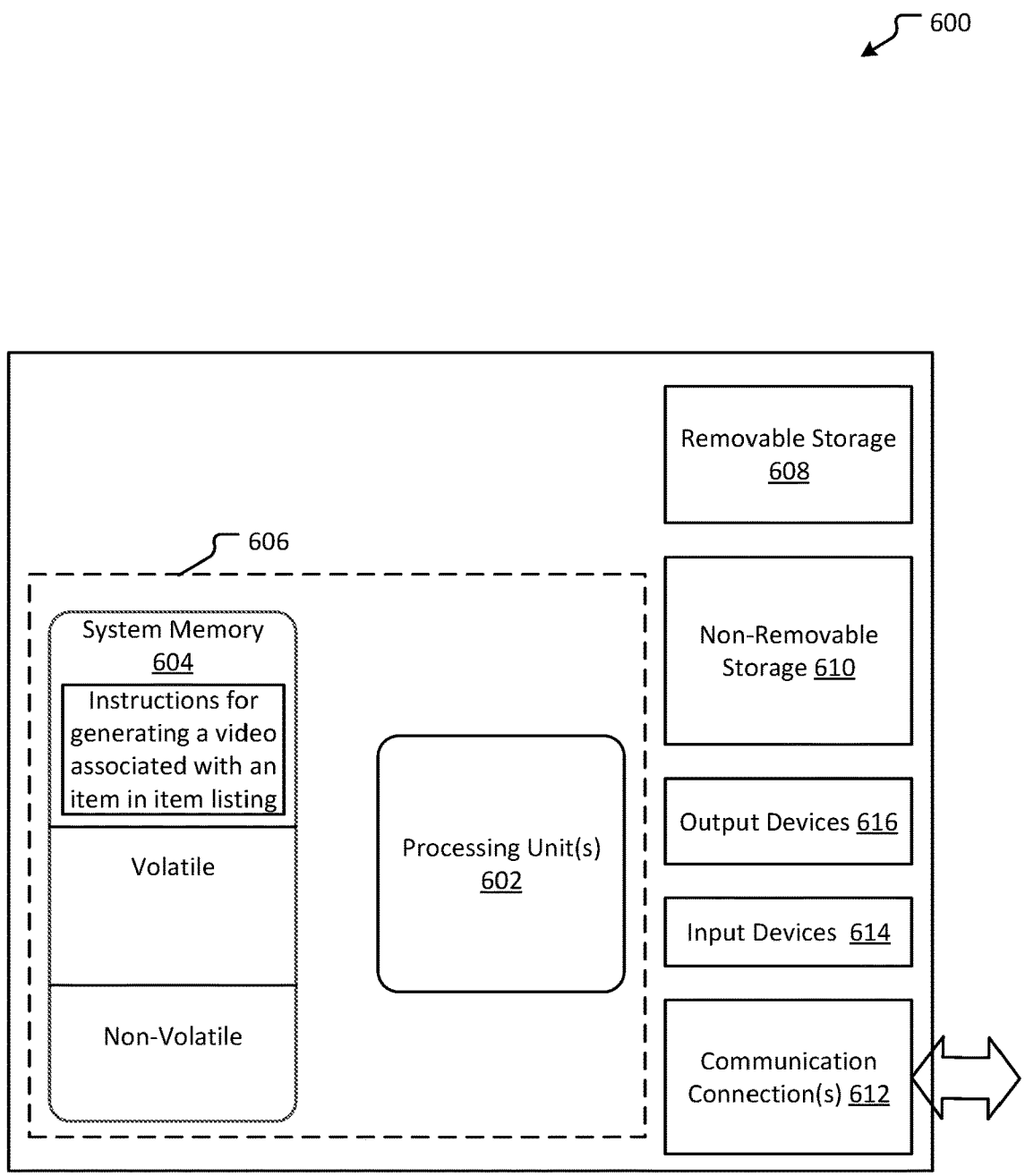
FIG. 6 is a block diagram illustrating example physical components of a computing device with which aspects of the disclosure may be practiced.

FIG. 6 illustrates a simplified block diagram of the device with which aspects of the present disclosure may be practiced in accordance with aspects of the present disclosure. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to perform generating a video associated with an item in an item listing as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as keyboard, mouse, pen, voice input, on-board sensors, etc. and/or output device(s) 616 such as a display, speakers, printer, motors, etc. Also included in the environment may be one or more communication connections, 612, such as LAN, WAN, a near-field communications network, point to point, etc.

Operating environment 600 typically includes at least some form of computer readable media. Computer readable media can be any available media that can be accessed by at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for automatically generating video data according to at least the examples provided in the sections below. In particular, the present disclosure relates to a computer-implemented method for automatically generating a video for an item listing in an e-commerce system. The method comprises receiving a set of images, wherein the set of images comprises a plurality of images received as part of the item listing; generating a set of visual descriptors for the set of images, wherein generating the set of visual descriptors comprises computing a visual descriptor, using a first machine-learning model, for each image in the set of images; comparing visual descriptors from the set of visual descriptors to identify one or more redundant images in the set of images; generating, based on the compared visual descriptors, a unique set of images by removing the one or more redundant images from the set of images; determining, based on the unique set of images, an ordered set of images, wherein the ordered set of images is ordered based at least upon a category of the item listing; automatically determining, using additional data from the item listing, text associated with one or more images in the ordered set of images, wherein the text associated with the one or more images is automatically added to the one or more images; automatically generating, based on the ordered set of images, the video, wherein the video comprises the ordered set of images; and providing the video as part of the item listing. The visual descriptor includes at least one of: a type of visual content, shape, appearance, color, or viewpoint. The category of the item listing includes a type of items for transaction in an online shopping marketplace. The method further comprises determining the ordered set of images using a second machine-learning model, wherein the second machine-learning model is trained on visual transitions for predicting a sequence of video segments of the video based on order criteria, and wherein the order criteria includes the category of the item listing. The method further comprises extracting a video frame from the video data, wherein the video frame includes the image; generating a feature map for the video frame, wherein the feature map includes a plurality of feature points indicating locations of at least an edge of an item depicted in the image; determining, based on the feature map, a region in the video frame using a third machine-learning model; determining a textual attribute based on one or more attributes of the region using the third machine-learning model, wherein the textual attribute include at least color or size of the text, and wherein the one or more attributes of the region include one or more colors appearing in the region; and inserting the text into the region using the textual attribute. The method further comprises receiving the text associated with the one or more images in the ordered set of image data; automatically determining, based at least on background color of the one or more images in the ordered set of images, a color of the text associated with the one or more images; and automatically determining, based at least on a texture of a background of one or more images of the ordered set of images, a position of one or more characters in the text. The method further comprises automatically generating, the video using a fourth machine-learning model, wherein the fourth machine-learning model is a trained model for predicting one or more adjustments to be made upon the video, and wherein the fourth machine-learning model is trained based on one or more adjustments made upon videos manually by users. The color of the text is distinct from the one or more colors appearing in the region.

Another aspect of the technology relates to a system for automatically generating a video describing an item in an e-commerce marketplace. The system comprises a processor; and a memory storing computer-executable instructions that when executed by the processor cause the system to receiving a set of images, wherein the set of images comprises a plurality of images received as part of the item listing; generating a set of visual descriptors for the set of images, wherein generating the set of visual descriptors comprises computing a visual descriptor, using a first machine-learning model, for each image in the set of images; comparing visual descriptors from the set of visual descriptors to identify one or more redundant images in the set of images; generating, based on the compared visual descriptors, a unique set of images by removing the one or more redundant images from the set of images; determining, based on the unique set of images, an ordered set of images, wherein the ordered set of images is ordered based at least upon a category of the item listing; automatically determining, using additional data from the item listing, text associated with one or more images in the ordered set of images, wherein the text associated with the one or more images is automatically added to the one or more images; automatically generating, based on the ordered set of images, the video, wherein the video comprises the ordered set of images; and providing the video as part of the item listing. The visual descriptor includes at least one of: a type of visual content, shape, appearance, color, or viewpoint. The category of the item listing includes a type of items for transaction in an online shopping marketplace. The computer-executable instructions when executed further cause the system to determine the ordered set of images using a second machine-learning model, wherein the second machine-learning model is trained on visual transitions for predicting a sequence of video segments of the video based on order criteria, and wherein the order criteria includes the category of the item listing. The computer-executable instructions when executed further cause the system to extract a video frame from the video data, wherein the video frame includes the image; generate a feature map for the video frame, wherein the feature map includes a plurality of feature points indicating locations of at least an edge of an item depicted in the image; determine, based on the feature map, a region in the video frame using a third machine-learning model; determine a textual attribute based on one or more attributes of the region using the third machine-learning model, wherein the textual attribute include at least color or size of the text, and wherein the one or more attributes of the region include one or more colors appearing in the region; and insert the text into the region using the textual attribute. The computer-executable instructions when executed further cause the system to receive the text associated with the one or more images in the ordered set of image data; automatically determine based at least on background color of the one or more images in the ordered set of images, a color of the text associated with the one or more images; and automatically determine, based at least on a texture of a background of one or more images of the ordered set of images, a position of one or more characters in the text. The computer-executable instructions when executed further cause the system to automatically generate, the video using a fourth machine-learning model, wherein the fourth machine-learning model is a trained model for predicting one or more adjustments to be made upon the video, and wherein the fourth machine-learning model is trained based on one or more adjustments made upon videos manually by users. The color of the text is distinct from the one or more colors appearing in the region.

In still further aspects, the technology relates to a computer-implemented method for automatically generating a video in an e-commerce system. The method comprises receiving a set of images, wherein each of images in the set of images describes in part an item for transaction in an online shopping marketplace, wherein the set of images include a first image and a second image, and wherein the first image includes a first region depicting the item; determining, based on a category of the item, a sequence of the set of images using a machine-learning model, wherein the sequence includes the first image preceding the second image; automatically generating the video, wherein the video includes a first video segment with the first image proceeding a second video segment with the second image; determining a second region in the first video segment, wherein the second region is without an overlap with the first region; inserting text data into the second region; and publishing the video in the online shopping marketplace for viewing. The text data corresponds to a message associated with promoting the item in the online-shopping marketplace. The machine-learning model is trained for predicting one or more visual transitions in the video that describes the item based on the category of the item. The determining the second region in the first video segment uses another machine-learning model for predicting the second region and textual attributes of the text data for insertion based on a combination of a feature of an image in the first video segment and the text data.

Any of the one or more above aspects in combination with any other of the one or more aspect. Any of the one or more aspects as described herein.

What is claimed is:

1. A computer-implemented method for automatically generating a video for an item listing in an e-commerce system, comprising:
    receiving, by a video generator of a server, a set of images from a client device as part of the item listing in the e-commerce system;
    generating, by the video generator, a set of visual descriptors for the set of images by computing, using a first machine-learning model, a respective visual descriptor for each image in the set of images;
    comparing, by an image extractor of the video generator, visual descriptors from the set of visual descriptors to identify one or more redundant images in the set of images;
    generating, by the video generator and based on the compared visual descriptors, a unique set of images by removing the one or more redundant images from the set of images;
    automatically generating, by the video generator and based on the unique set of images, the video, wherein the video comprises the unique set of images ordered in accordance with a predicted sequence of image data based at least in part on a category of the item listing;
    extracting, by a text placer of the video generator, a video frame from the video, wherein the video frame includes an image;
    generating, by the text placer, a feature map for the video frame, the feature map including a plurality of feature points indicating locations of at least an edge of an item depicted in the image;
    based on the feature map, predicting, by the text placer and using a second machine learning model, a region of the video frame to insert text associated with the image, wherein the region is non-overlapping with the item depicted in the image;
    predicting, by the text placer and using the second machine learning model, at least one textual attribute of the text associated with the image based at least in part on the text, the feature map, and one or more attributes of the region, wherein the at least one textual attribute includes at least color or size of the text, and wherein the one or more attributes of the region include one or more colors appearing in the region of the video frame;
    automatically inserting, by the video generator, the text into the region of the video frame in accordance with the at least one textual attribute;
    storing, by a video data optimizer of the video generator, the video including the video frame with the inserted text;
    automatically inserting, by the server, the stored video into the item listing; and
    displaying, via a user interface of the client device, the stored video as part of the item listing.

2. The computer-implemented method of claim 1, wherein the respective visual descriptor includes at least one of: a type of visual content, shape, appearance, color, or viewpoint.

3. The computer-implemented method of claim 1, wherein the category of the item listing includes a type of items for transaction in an online shopping marketplace.

4. The computer-implemented method of claim 1, further comprising:
    determining the predicted sequence of image data for ordering the unique set of images using a third machine-learning model, wherein the third machine-learning model is trained on visual transitions for predicting a sequence of video segments of the video based on order criteria, and wherein the order criteria includes the category of the item listing.

5. The computer-implemented method of claim 1, further comprising:
    receiving the text associated with one or more images in the unique set of images;
    automatically determining, based at least on a background color of the one or more images in the unique set of images, a color of the text; and
    automatically determining, based at least on a texture of a background of one or more images of the unique set of images, a position of one or more characters in the text.

6. The computer-implemented method of claim 1, further comprising:
    automatically generating the stored video using a fourth machine-learning model, wherein the fourth machine-learning model is a trained model for predicting one or more adjustments to be made upon the stored video, and wherein the fourth machine-learning model is trained based on one or more adjustments made upon videos manually by users.

7. The computer-implemented method of claim 1, wherein the color of the text is distinct from the one or more colors appearing in the region.

8. A system for automatically generating a video describing an item in an e-commerce marketplace, the system comprising:
- a processor; and
- a memory storing computer-executable instructions that when executed by the processor cause the system to:
  - receive, by a video generator of the system, a set of images from a client device as part of an item listing for the item in the e-commerce system;
  - generate, by the video generator, a set of visual descriptors for the set of images by computing, using a first machine-learning model, a respective visual descriptor for each image in the set of images;
  - compare, by an image extractor of the video generator, visual descriptors from the set of visual descriptors to identify one or more redundant images in the set of images;
  - generate, by the video generator and based on the compared visual descriptors, a unique set of images by removing the one or more redundant images from the set of images;
  - automatically generate, by the video generator and based on the unique set of images, the video, wherein the video comprises the unique set of images ordered in accordance with a predicted sequence of image data based at least in part on a category of the item listing;
  - extract, by a text placer of the video generator, a video frame from the video, wherein the video frame includes an image;
  - generate, by the text placer, a feature map for the video frame, the feature map including a plurality of feature points indicating locations of at least an edge of an item depicted in the image;
  - based on the feature map, predict, by the text placer and using a second machine learning model, a region of the video frame to insert text associated with the image, wherein the region is non-overlapping with the item depicted in the image;
  - predict, by the text placer and using the second machine learning model, at least one textual attribute of the text associated with the image based at least in part on the text, the feature map, and one or more attributes of the region, wherein the at least one textual attribute includes at least color or size of the text, and wherein the one or more attributes of the region include one or more colors appearing in the region of the video frame;
  - automatically insert, by the video generator, the text into the region of the video frame in accordance with the at least one textual attribute;
  - store, by a video data optimizer of the video generator, the video including the video frame with the inserted text;
  - automatically insert, by the system, the stored video including into the item listing; and
  - display, via a user interface of the client device, the stored video as part of the item listing.

9. The system of claim 8, wherein the respective visual descriptor includes at least one of: a type of visual content, shape, appearance, color, or viewpoint.

10. The system of claim 8, wherein the category of the item listing includes a type of items for transaction in an online shopping marketplace.

11. The system of claim 8, wherein the computer-executable instructions when executed further cause the system to:
- determine the predicted sequence of image data for ordering the unique set of images using a third machine-learning model, wherein the third machine-learning model is trained on visual transitions for predicting a sequence of video segments of the video based on order criteria, and wherein the order criteria includes the category of the item listing.

12. The system of claim 8, wherein the computer-executable instructions when executed further cause the system to:
- receive the text associated with one or more images in the unique set of images;
- automatically determine based at least on background color of the one or more images in the unique set of images, a color of the text; and
- automatically determine, based at least on a texture of a background of one or more images of the unique set of images, a position of one or more characters in the text.

13. The system of claim 8, wherein the computer-executable instructions when executed further cause the system to:
- automatically generate the stored video using a fourth machine-learning model, wherein the fourth machine-learning model is a trained model for predicting one or more adjustments to be made upon the stored video, and wherein the fourth machine-learning model is trained based on one or more adjustments made upon videos manually by users.

14. The system of claim 8, wherein the color of the text is distinct from the one or more colors appearing in the region.

* * * * *